(12) United States Patent
Castro Recacha

(10) Patent No.: US 12,202,562 B2
(45) Date of Patent: Jan. 21, 2025

(54) ANTITHEFT SUPPORT DEVICE FOR BICYCLES

(71) Applicant: SECURE BIKE S.L, Barcelona (ES)

(72) Inventor: Francisco Castro Recacha, Barcelona (ES)

(73) Assignee: SECURE BIKE SL, Barcelona (ES)

( * ) Notice: Subject to any disclaimer, the term of this patent is extended or adjusted under 35 U.S.C. 154(b) by 0 days.

(21) Appl. No.: 17/768,486

(22) PCT Filed: Oct. 15, 2020

(86) PCT No.: PCT/ES2020/070629
§ 371 (c)(1),
(2) Date: Apr. 13, 2022

(87) PCT Pub. No.: WO2021/074473
PCT Pub. Date: Apr. 22, 2021

(65) Prior Publication Data
US 2024/0294224 A1 Sep. 5, 2024

(30) Foreign Application Priority Data

Oct. 18, 2019 (ES) ............................... ES201930925

(51) Int. Cl.
*B62H 3/12* (2006.01)
(52) U.S. Cl.
CPC ...................................... *B62H 3/12* (2013.01)
(58) Field of Classification Search
CPC ... B62H 3/12; B62H 3/04; B62H 3/06; B62H 3/08; B62H 3/10; B62H 3/00; B62H 2003/005

USPC ...................... 211/17, 18, 19, 20, 22, 23, 24
See application file for complete search history.

(56) References Cited

U.S. PATENT DOCUMENTS

| 4,050,616 | A | * | 9/1977 | Mosow | ..................... B60R 9/06 224/532 |
| 9,439,505 | B2 | * | 9/2016 | McPheeters | ........... A47B 47/00 |
| 9,499,223 | B2 | * | 11/2016 | Oviatt | ...................... B62H 5/06 |
| 9,504,322 | B1 | * | 11/2016 | McJunkin | ................ B62H 3/12 |
| 2014/0266588 | A1 | * | 9/2014 | Majzoobi | ................. B62H 5/20 340/5.61 |

* cited by examiner

*Primary Examiner* — Stanton L Krycinski
(74) *Attorney, Agent, or Firm* — Jose Cherson Weissbrot

(57) ABSTRACT

A device for space-optimised bicycle storage as well as protection against the most frequent conventional thefts, including those using bolt cutters. The device comprises a bike rack that is fixed to the wall, floor or ceiling, and a retaining bar with a lock that is anchored to the bike rack in order to protect the bicycles. Apart from fulfilling two functions simultaneously, the invention comprises an innovative structural design of the assembly and its elements such it allows reduced cost production, even for small production runs, using materials available on the market and processed using laser-cutting machinery configured with the design specific parameters. This eliminates specific manufacturing tooling and minimises operating costs for batch production arrangements. Moreover, this innovative structural design also enables entirely manual assembly of the components without the need for machinery.

1 Claim, 5 Drawing Sheets

ANTITHEFT SUPPORT DEVICE FOR BICYCLES

TECHNICAL FIELD

This invention falls under the bicycle accessories sector—specifically storage and anti-theft mechanisms.

BACKGROUND TO THE INVENTION

The closest state of the art prior to this invention were the following:
- Bicycle rack device for parking and storing. An example of these are the wall-mounted support arms formed by an inverted U-shaped bar fixed to the wall, the lower arms of which form an elbow that lies approximately perpendicular to the wall and on which the bicycle is placed so that it is raised and supported.
- Generic or bike-specific anti-theft devices that have key or combination locks and available in many outlets, which can be classed as rigid (usually in the shape of an elongated D); flexible (chains and cables with security lock); or the more recently available folding locks (similar to a classic carpenter's rule but with highly resistant links and joints).

SUMMARY OF THE INVENTION

This invention comprises an anti-theft rack device (1000) for secure bicycle storage. The device allows for convenient storage of one or more bicycles in a secure manner and can resist the most common theft attempts, including those involving bolt cutters. In particular, and most important, the invention also allows low-cost production even for small production runs by being characterised by a structural design that does not require an initial investment in specific manufacturing tooling, minimises the costs of preparing each production run and allows very simple manual assembly—all thanks to a design based on digital manufacturing Industry 4.0 methods.

The anti-theft rack comprises a bike rack to be firmly attached to a wall, floor or any rigid structural part in the area where bicycles are stored so that it cannot be easily released either whole or in parts. This bike rack can be implemented, for example, as a wall bracket such as those currently marketed in the form of a letter U with both ends parallel to each other and at an angle approximately perpendicular to the wall and upon which the bicycle can be placed (for clarity, in the description we will use the singular but please bear in mind that the device is applicable to more than one bicycle). Although in this document reference is made mainly to only the embodiment of the invention in the form of a wall bike rack, different rack geometries could be used for assembly, for instance, on ceiling or floor but always using two straight, parallel and horizontal support arms.

The bracket also includes a retaining bar, which can be anchored onto the ends of the support arms. It is released by opening a lock operated by a key (or any other coded mechanism—such as, for example, a number combination lock).

The principle of the anti-theft device is based on the fact that the bicycle is placed on the storage stand such that its ends are inserted into one of the bike frame substructures in such a way that when the retaining bar is fixed onto the bike rack, the assembly is topologically locked, like a large padlock, to one of the substructures of the bike frame, making it impossible for the bike to be removed.

The bike rack comprises a tube, or similar such as a rigid U-shaped metal rod, with a series of holes in its base for screwing to the wall. The two end sections of that U will act as support arms on which the bicycle will rest so that, at least, one of them will pass through a closed substructure of the bike frame. In addition, close to the end of each support arm there is a retention slot which runs perpendicular to the arm and onto which the retaining bar anchoring mechanism is locked when it is closed.

Operation and Use

To store a bicycle, it shall be placed on the anti-theft rack by first removing the retaining bar and inserting the support arms of the bike rack into the bicycle frame so that it is held when the retaining bar is put back by inserting the ends of the support arms into the insertion holes and locked by pushing on the part of the inner carriage that protrudes from the rear end of the retaining bar when the latter is in the open position.

Note: We use the term "front side/end/direction/ . . . " of the retaining bar to mean the side where the lock is located and "rear side/end/direction/ . . . " to mean the opposite side, where the end of the inner carriage protrudes when opening.

Note that when the retaining bar is open, the insertion holes opening is free, allowing the ends of the support arms to be inserted. Once this is done, the user actuates the locking mechanism by pushing on the end of the inner carriage inwards the outer tube until the latch bolt finds the locking hole in the inner carriage and enters spontaneously, leaving the unit locked. Since the contour of the front and rear retention holes of the support arms of the inner carriage will have become strangled by the retention slots of the support arms, the retaining bar will be locked as a block to the arms of the bike rack and if the bicycle has been correctly placed in the rack then it will be secured until the device is opened.

Similarly, to remove the bicycle, the user opens the lock using the corresponding key (or code-based mechanism depending on the lock type) so that, as the latch bolt retracts from the locking hole it releases the inner carriage and by spontaneous expansion of the opening spring the inner carriage moves outwards the outer tube, the retention slots become released and the retaining bar can be removed.

Innovation, Technical Problem Solved and Invention Activity

Compared to the state of the art, the proposed invention is innovative not only in functional terms, combining as it does two functions in one single device, but also—and fundamentally—for the structural characteristics of a novel design developed using "Industry 4.0" methods, which allows production without initial investment in specific manufacturing tools and with reduced production costs, even for small production runs.

Its inventive nature is based on the fact that existing products require specific tools for their manufacture such as casting moulds, cutting and/or bending dies, etc, which entail a considerable initial investment and also significant operating costs each time it is needed to enter into production. In view of this, the main innovation of the solution proposed here is a structural design such that the production of specific components (those not available on the market) is achievable in a digital manufacturing environment by online configuration of general-purpose laser-cutting and/or turning machines fed by steel bars, tubes or flats already available on the market. This avoids investment in costly tooling, such as the casting moulds used by almost all existing solutions, which can only be amortised across large market scales. Furthermore, the absence of specific tools also minimises the cost of production preparation for each batch, as this is limited to a simple online reconfiguration of the operating parameters of the machinery without the need to prepare specific elements.

A second highly relevant property of this invention as a technological innovation compared to the state of the art, is that the design of its components (in particular those of the retaining bar) also allow a simple manual assembly as a three-dimensional puzzle, thus also eliminating the complexity, machinery and cost usually required at this stage of production.

Ultimately, the innovation behind this invention lies in a structural design that can be made from materials and components available on the market at very low costs even for small batches, thus making it possible for even a small start-up to exploit it industrially—as is the case of this invention's applicant—in a global market dominated mainly by a few large players.

EXAMPLES

Without limiting other potential approaches, the following examples illustrate several possible ways this invention can be implemented.

Example 1

Anti-theft rack, the bike rack of which is made of steel tube bent into a U-shape and with the ends of the U bent in turn at right angles to the plane of the wall. In this case, at the ends of the support arms, slots would be located at the top and bottom as retention slots.

Example 2

Anti-theft rack, the bike rack (2000) of which is made as a rigid metal U with two solid cylindrical rods welded to a rectangular tube and fixed in the horizontal plane by means of a pair of metal brackets.

Example 3

Anti-theft rack, the lock of which is opened by means of a code.

Example 4

Anti-theft rack, the lock of which is opened using a secret number code and a pushbutton.

Example 5

Anti-theft rack with electronic lock remotely operated from, for example, a mobile phone, and optionally equipped with electronic surveillance and alarm mechanisms.

BRIEF DESCRIPTION OF THE FIGURES

The attached set of figures illustrate the main structural features of the invention.

DETAILED DESCRIPTION OF POSSIBLE EMBODIMENTS

Figure 1:
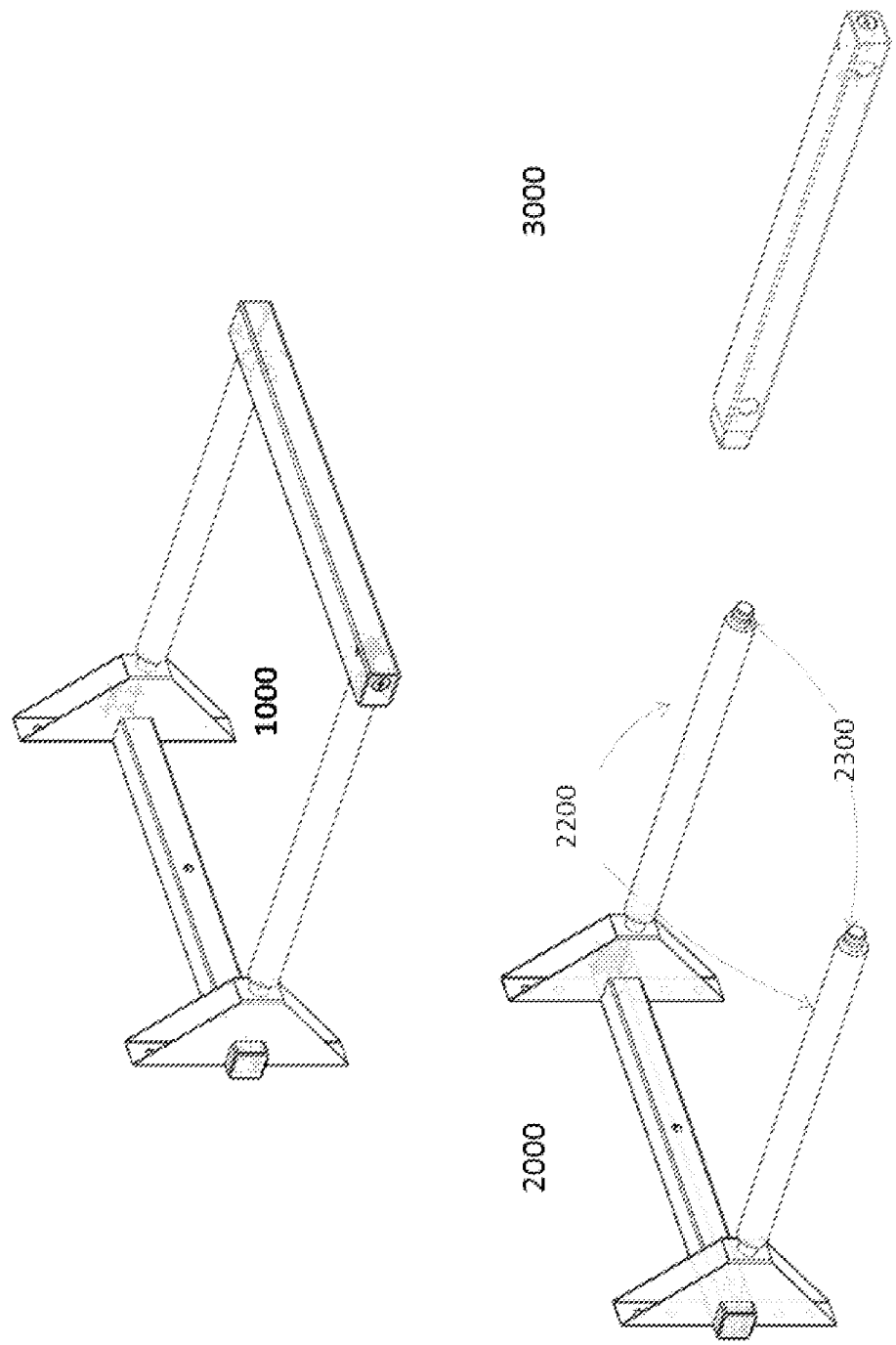
FIG. 1 illustrates a view of an anti-theft bike rack and view of a bike rack separated from a retaining bar identifying the support arms with their respective retention slots, in accordance with an exemplary embodiment of the present disclosure.

The proposed invention allows different embodiments both for the retaining bar (3000) and the bike rack (2000). However, this explanation of possible embodiments focuses on variants of the retaining bar (3000) as it is where the innovation is concentrated. Moreover, it shall be mentioned that the bike rack (2000) can be implemented in a number of quite obvious ways such as, for example, in the form of a wall support using bent round steel tube, or using a rigid support U fixed to the wall using brackets as shown in FIG. 1. This component also enables a range of different embodiments depending on the structural part against which it is installed—whether a wall, floor, ceiling, etc.

Figure 2:
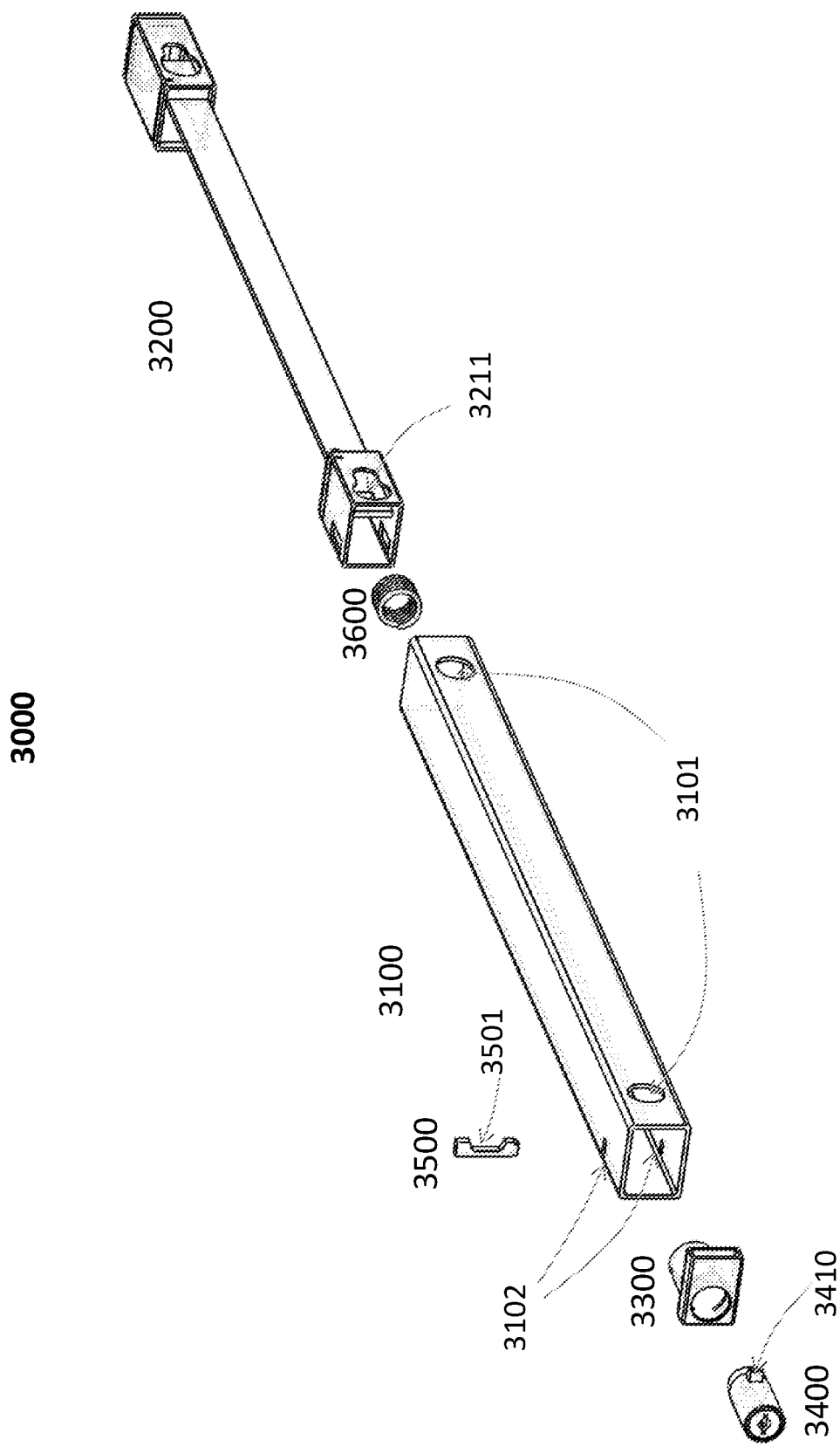
FIG. 2 illustrates an exploded view of the components of a detachable retaining bar having an inner carriage that comprises two segments of rectangular tube, in accordance with a first exemplary embodiment of the present disclosure.

A preferred embodiment is presented here in which the construction of the inner carriage (3200) of the retaining bar (3000) employs two short tube segments—one at each end—both used to guide the unit inside the outer tube (3100) and to strangle the insertion holes (3101) (see FIG. 2). Moreover, a secondary embodiment is also included (see FIG. 3) in which the structure of the inner carriage (3200) is organised with a single long tube segment performing the same function but adding greater shear strength to the retaining bar (3000).

Preferred Embodiment 1

This embodiment comprises an anti-theft rack device (1000) comprising a bike rack (2000) and a retaining bar (3000), both made of hardened steel so that they cannot easily be broken. The bike rack (2000) firmly fixed in position in the storage space, for example to a wall, and with two cylindrical, parallel, horizontal support arms (2200) on which to place the bicycles and with retention slots (2300) located transversely at the end of the arms. When positioning bikes, each of the support arms passes through different parts of the bicycle structure such that when the retaining bar (3000) is engaged on the support arms (2200) they will be retained until the retaining bar (3000) is removed.

On the other hand, the retaining bar (3000) comprises an assembly, which can be made manually without tools, of the following subassemblies and components that can be manufactured from commercial tubes or plates using high-precision laser-cutting machines and without the need to manufacture any specific tooling thanks to its structural characteristics:

Outer tube (3100): rectangular tube of a suitable length and with a series of holes on its surface:
Circular insertion holes (3101) of sufficient diameter to insert the ends of the support arms (2200);
Retainer mounting holes (3102) where the retainer (3500) is inserted to immobilise the assembly— formed by the lock bracket (3300), the lock (3400) and the retainer (3500) itself—and to delimit the travel of the inner carriage (3200).

Inner carriage (3200) which, when pushed from the rear side of the retaining bar (3000), slides into the outer tube (3100) until the latch bolt (3410) spontaneously moves into the locking hole (3211) blocking the retaining bar (3000) locking mechanism until the lock (3400) is opened so as to retract the latch bolt (3410) and thus release the locking hole (3211), at which time the opening spring (3600) will push the inner carriage (3200) to the maximum opening position allowed by the travel slots (3222) of the front sub-carriage (3220) as their front flanks meet the retainer (3500). This inner carriage (3200) comprises a manual assembly without welds of the following subcomponents:

Rear sub-carriage (3230): rectangular tube segment with the same section shape as the outer tube (3100), but slightly smaller than its inner perimeter (the difference shall be less than the thickness of the first tube), and with a series of holes on its surface:

Upper slot (3232) of the rear sub-carriage through which a divider (3240) is inserted without clearance, and which fastens the upper flank of said divider;

Lower slot (3233) of the rear sub-carriage into which the lower flank of the divider (3240) is inserted and fastened in position;

Rear retention hole (3231) shaped as a slotted hole with two sections of different widths and next to the rear side of the divider (3240). The wider section coincides in the open position with the insertion hole (3101) in the outer tube (3100), allowing the end of the support arm (2200) to pass through. In turn, in the locked position, the narrow section of rear retention hole (3231) strangles the support arm (2200) through its corresponding retention slot (2300) making it impossible to remove the retaining bar (3000).

Front sub-carriage (3220): segment of the same tube as the rear sub-carriage (3230) and with a series of holes:

Upper slot of the front sub-carriage (3224), analogous to the upper slot (3232) of the rear sub-carriage;

Lower slot of the front sub-carriage (3223), analogous to the lower slot (3233) of the rear sub-carriage;

Front retention hole (3221), analogous to the rear retention hole (3231);

Travel slots (3222) that restrict the travel of the inner carriage (3200) when its front and rear flanks meet with the retainer (3500).

Latch (3210): long flat rectangular plate that is not as high as the inside vertical pitch of the front and rear sub-carriages (3220 and 3230) and the length of which is such that when the unit is assembled, the separation between the front and rear retention holes (3221 and 3231) of the support arms matches the one between of the insertion holes (3101) in the outer tube (3100). With this purpose, the upper flank of the latch (3210) has two front (3212) and rear (3213) slots which are interlocked with the corresponding fitting slots (3241) in the two dividers (3240) to form a single body of the whole unit. Near to the front end of the latch (3210) is the locking hole (3211). When the inner carriage (3200) is pushed inwards, the latch bolt (3410) slides into the locking hole (3211) and blocks the inner carriage (3200) upon reaching the locked position and in which the narrow part of the front and rear retention holes (3221 and 3231) coincide with the insertion holes (3101).

Front and rear dividers (3240): two identical plates with height and width that match the front and rear sub-carriages (3220 and 3230), and a profile such that they can be slid through the upper slot of the sub-carriages until their lower flank is inserted into the lower slot at the same time as the fitting slots (3241) interlock with the corresponding front and rear slots (3212 and 3213) of the latch (3210).

End cap (3260) Commercial rectangular plastic cap that tops the outside of the rear sub-carriage (3230) to facilitate manual pressure to slide the inner carriage (3200) from the open position to the locked position.

Opening spring (3600): a compression spring located between the rear of the lock bracket (3300) and the front face of the divider (3240) on the front sub-carriage (3220) such that it exerts an ejection force onto the inner carriage (3200).

Retainer (3500) to restrict the inner carriage (3200) tour and immobilise the assembly made up of the lock bracket (3300), the lock (3400) and the retainer (3500) itself. Elongated flat rectangle that is as long as the height of the outer tube and with a blocking recess (3501) on one side that, when assembling the lock (3400), the rear part of the lock slides into said blocking recess (3501), immobilising the retainer (3500) and making impossible to disassemble the assembly.

Cylindrical commercial lock (3400) with a latch bolt (3410) that expands spontaneously and partially retracts when opened with a key. This latch bolt has a flat front face so that when sliding into the locking hole (3211) of the inner carriage (3200), it remains locked until the lock (3400) is opened. Its rear face has a slope that allows the latch (3210) to slide smoothly from the initial open position to the locked position, when the latch bolt (3410) will spontaneously slide inside the locking hole (3211) automatically locking the inner carriage (3200) in the locked position. When the lock (3400) is opened, the latch bolt (3410) will also retract sufficiently to release the latch (3210) and allow the opening spring (3600) to push the inner carriage (3200) to the open position. However, when opening with the key, the latch bolt (3410) will be partially outside the body of the lock (3400) such that it will not be released from the lock bracket (3300). The only way to fully retract the latch bolt (3410), which is necessary for assembly, is by directly pressing it.

Lock bracket (3300) which, on the one hand, closes the front end of the retaining bar (3000) leaving access only for the lock (3400) insertion during its assembly at factory and for key insertion during regular use. On the other hand, it houses and holds the lock (3400) in its precise position. It is made up of:

Lock socket (3310), the inside of which houses the lock (3400) and has the following holes:

Latch bolt hole (3311) which, on the one hand, allows the end of the latch bolt (3410) to enter the locking hole (3211) in the locked position and immobilises the lock (3400) inside even in open position since the latch bolt (3410) does not fully retract;

Retainer mounting holes (3102) through which the retainer (3500) passes without clearance for the purpose of positioning and immobilising the lock bracket (3300) and lock (3400);

The cap's assembly slots (3314) for interlocking with the cap (3320), by sliding its front part within the cap (3320) such that once inserted both parts form a solid unit.

Cap (3320): rectangular tube segment which purpose is twofold, first to close the front end of the retaining bar (3000) leaving space only for key access to the lock (3400), and second to position and immobilise the lock transversally to the outer tube (3100). The length of the segment is slightly less than the horizontal pitch of the outer tube (3100) and the longest side of the used commercial tube shall be slightly less than the vertical pitch of the outer tube (3100) so that it can be inserted into the outer tube, capping it. It also has:

Lock insertion hole (3321), in the front face and circular in shape through which, once the lock (3400) has been inserted, it holds it in place transversely and leaves access to opening it with a key;

Socket assembly slot (3322) on the rear face, for interlocking with the lock socket (3310) such that the front of said lock socket is fitted to the inside face of the front side of the cap (3320) and the cap assembly slots (3314) are fitted to the rear face of the cap (3320) and to the profile of the socket assembly slot (3322) such that, at the end of the interlocking assembly, a single united piece is formed without any possible movement between its parts.

Note that once the lock bracket (3300) has been inserted into the outer tube (3100) and immobilised by sliding the retainer (3500) through the retainer mounting holes (3102) and the retainer blocking holes (3312) when the lock (3400) is finally inserted through the lock insertion hole (3321), the entire unit is assembled, with the only potential movement between the parts being the longitudinal displacement of the inner carriage (3200) between the locked and open positions, in this second case protruding from the rear of the outer tube (3100) allowing manual pressure to return to the locked position.

Secondary Embodiment 2

Figure 3:
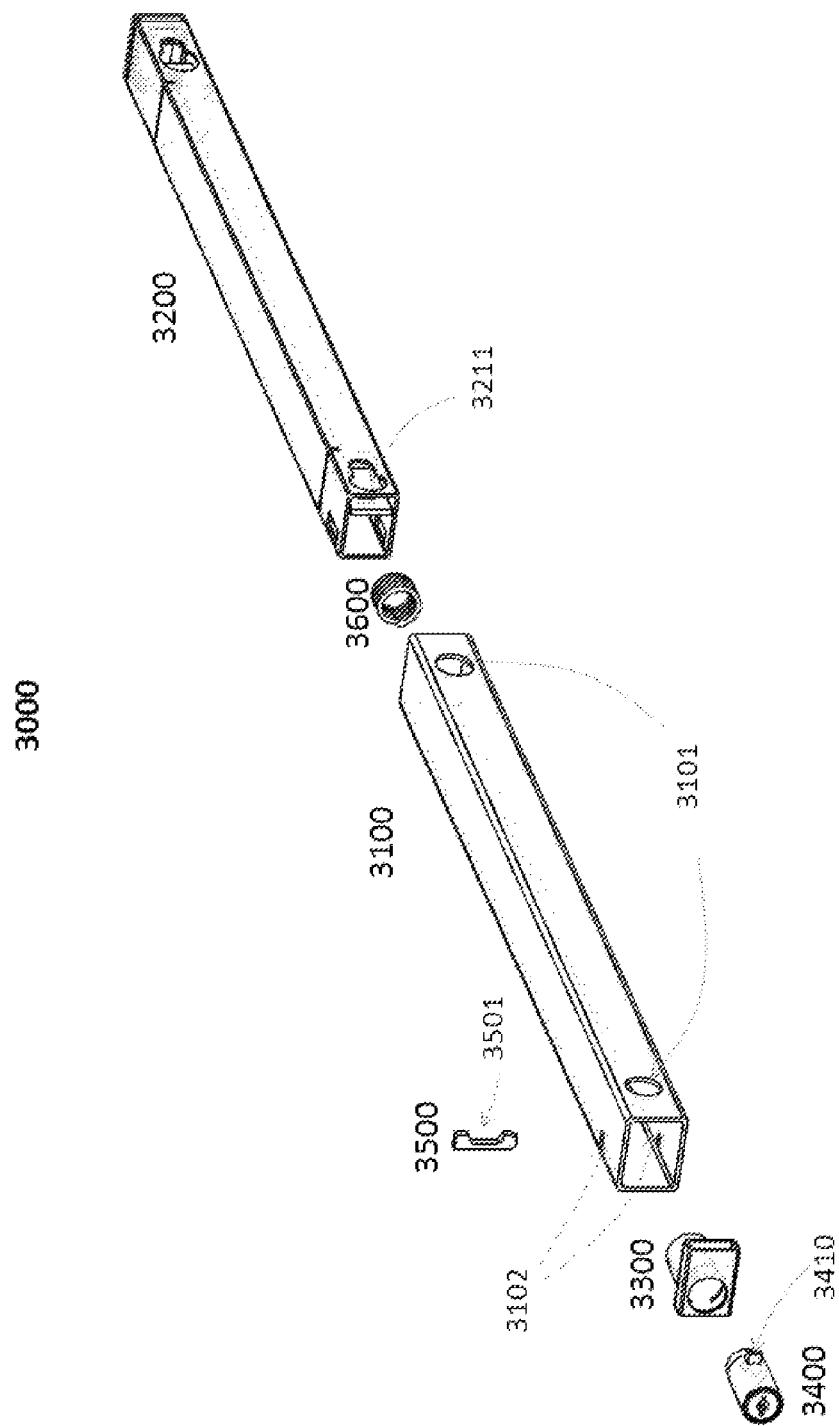
FIG. 3 illustrates an exploded view of the components of a detachable retaining bar having a inner carriage that comprises only one rectangular tube segment, in accordance with a second exemplary embodiment of the present disclosure.
Figure 4:
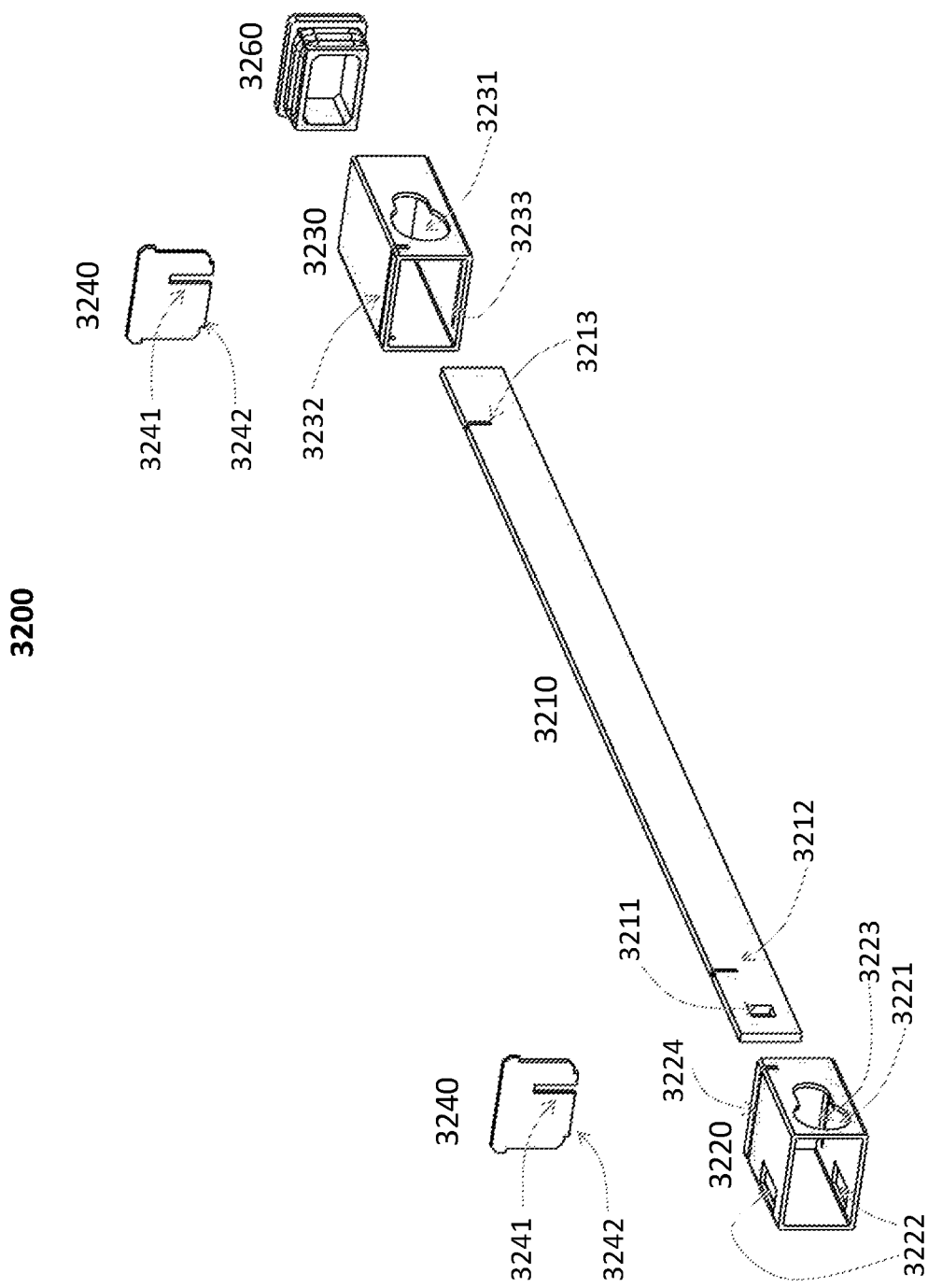
FIG. 4 illustrates an exploded view of an inner carriage, in accordance with an exemplary embodiment of the present disclosure.
Figure 5:
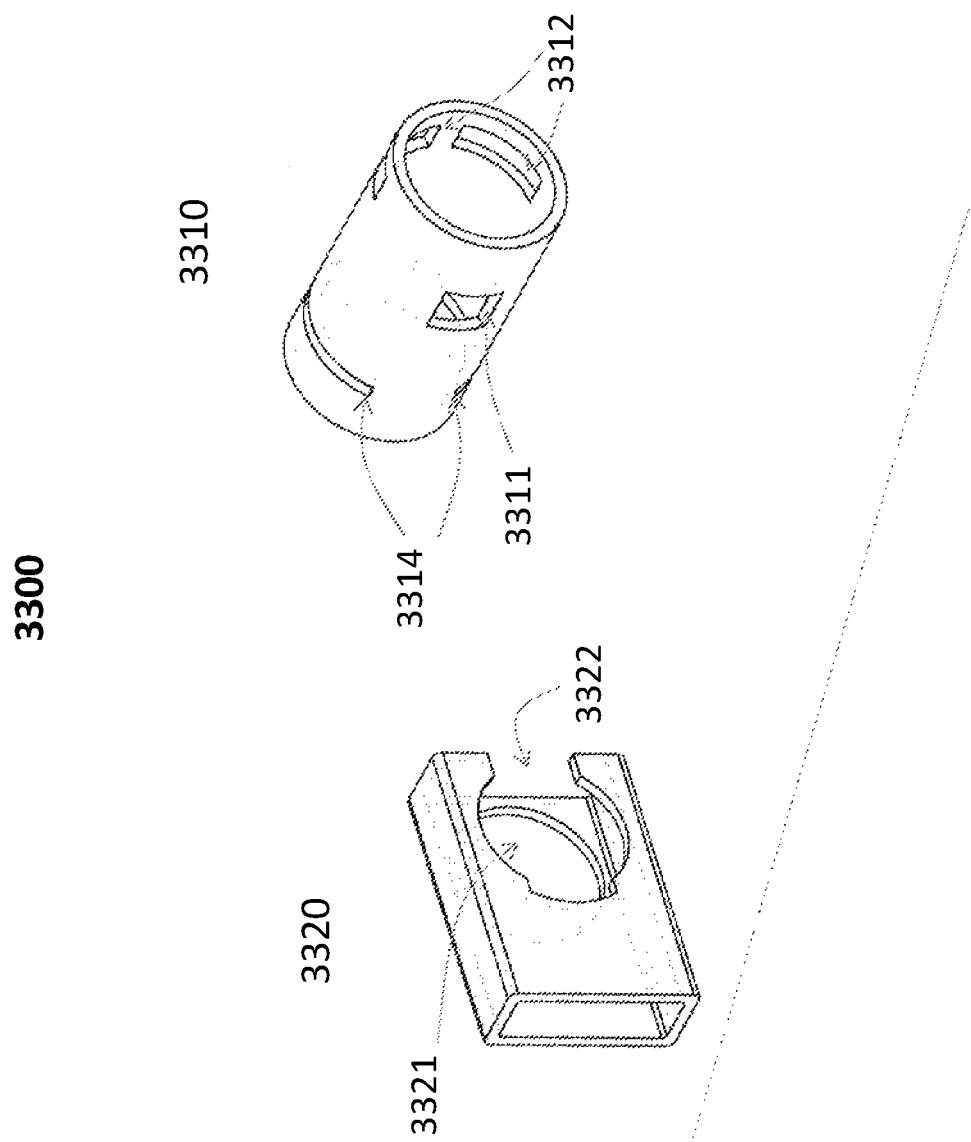
FIG. 5 illustrates an exploded view of a lock bracket part, in accordance with an exemplary embodiment of the present disclosure.

As shown in FIG. 3, the implementation of the functions of the front and rear sub-carriages (3220 and 3230) in this secondary embodiment is now done by means of a single commercial rectangular tube of the same characteristics but longer in length and with suitable spacing of all the holes specified for the sub-carriages. By having cross section with larger mass, this variation provides a higher resistance to cutting.

What is claimed is:

1. An anti-theft bike rack device (1000) with a bike rack (2000) having a pair of support arms (2200), each support arm having a retention slot (2300) and comprising a detachable retaining bar (3000) configured to be manufactured by laser cutting from commercial tubes and plates and configured to be assembled by hand, the detachable retaining bar comprising:

an outer tube (3100) having:
insertion holes (3101) where the pair of support arms (2200) are inserted, and
retainer mounting holes (3102);

an inner carriage (3200) that slides inside the outer tube (3100), and having:
a rear sub-carriage (3230), with the same, but smaller, cross-tube sectional shape as the tube (3100), and having
an upper slot (3232) of the rear sub-carriage,
a lower slot (3233) of the rear sub-carriage immobilizing a respective divider (3240), and
a rear retention hole (3231) in the form of a slotted hole with two sections of different widths, wherein a larger section of the slotted hole coincides in an open position with the insertion holes (3101), and a smaller section that strangles the retention slots (2300) of the support arms (2200) in a closed position;
a front sub-carriage (3220) segment of the same tube cross-section as the rear sub-carriage (3230) and having:
an upper slot (3224) of the front sub-carriage segment and a lower slot (3223) of the front sub-carriage segment, and being equivalent to the respective upper slot (3232) and lower slot (3233) of the rear sub-carriage (3230),
a front retention hole (3221) equivalent to the rear retention hole (3231), and
travel slots (3222) to restrict the travel of the inner carriage (3200) when their front and rear flanks of the inner carriage collide with a retainer (3500);
a latch (3210), in the form of a rectangular plate having:
front and rear slots (3212 and 3213),
a locking hole (3211) into which a latch bolt (3410) snaps when sliding the inner carriage (3200), blocking the inner carriage (3200); and
the divider comprising front and rear dividers (3240) in the form of identical plates having fitting slots (3241) to respectively interlock with the front and rear slots (3212 and 3213) of the latch (3210);
an opening spring (3600) placed between a lock bracket (3300) and the front divider (3240) of the front sub-carriage (3220);
the retainer (3500); being a plate crossing the retainer mounting holes (3102), the travel slots (3222) and retainer blocking holes (3312), and having a blocking recess (3501) on one side to engage with the rear end of a lock (3400) to block the lock (3400);
the lock (3400) having a cylindrical body and including the latch bolt (3410) that retracts when the lock (3400) is in an open position, the latch bolt (3410) having a flat front face, so as when the latch bolt (3410) slides into the locking hole (3211), the inner carriage (3200) is locked, and an inclined rear face to allow the latch (3210) to slide from the open position to a locked position; and
the lock bracket (3300) covering a forward end portion of the detachable retaining bar (3000), leaving access only for inserting the lock (3400), and housing and immobilizing the lock (3400) in a final position; the lock bracket (3300) comprises:
a lock socket (3310), in the form of a cylindric tube segment housing the lock (3400) and having:
a latch bolt hole (3311), through which the latch bolt (3410) exits,
the retainer blocking holes (3312), through which the retainer (3500) passes, and
cap assembly slots (3314) to interlock with a cap (3320);

the cap (3320), in the form of a rectangular tube segment covering the front end of the retaining bar (3000); the cap (3320) positions and immobilizes the lock (3400) transversely and has a lock insertion hole (3321), and a socket assembly slot (3322) where the lock socket (3310) interlocks.

\* \* \* \* \*